Nov. 10, 1925.  1,560,806
A. SCHÜCKHER
METHOD OF AND APPARATUS FOR HEATING WATER
Filed Nov. 13, 1922
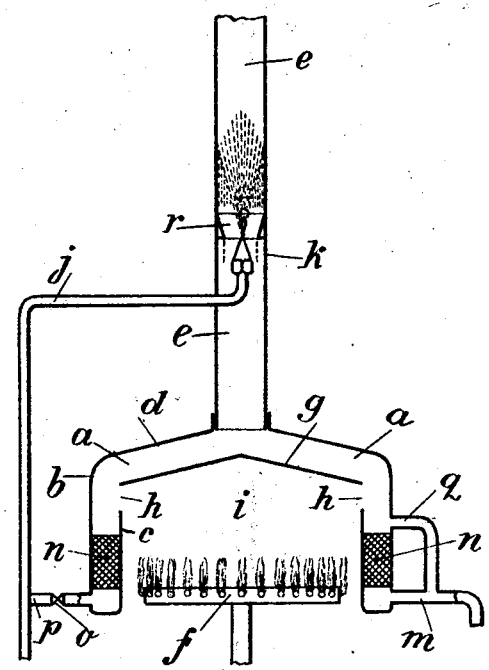
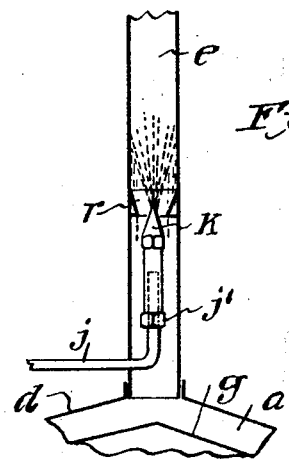
Inventor
Albert Schückher
By Arthur L. Kent
his Atty Patented Nov. 10, 1925.

1,560,806

UNITED STATES PATENT OFFICE.

ALBERT SCHÜCKHER, OF VIENNA, AUSTRIA.

METHOD OF AND APPARATUS FOR HEATING WATER.

Application filed November 13, 1922. Serial No. 600,734.

*To all whom it may concern:*

Be it known that I, ALBERT SCHÜCKHER, engineer, a citizen of the Austrian Republic, and residing at Vienna, VII. Gardegasse 9, have invented certain new and useful Improvements in Methods of and Apparatus for Heating Water, of which the following is a specification.

The invention relates to methods and apparatus for heating liquids, chiefly water, of the kind, in which the water to be warmed is mixed with the combustion gases of gas burners for the purpose of utilizing the heat to a higher degree and to simplify the apparatus in comparison with the devices generally used, in which latter the transferring of the heat takes place indirectly. In some of the known apparatus the mixing of the water to be warmed with the combustion gases is effected by means of a spray-nozzle, connected with a water duct under pressure. The nozzle is disposed beyond the combustion zone and by its suction effect leads the combustion gases in a stream of the same direction as the water particles through a mixing chamber. In such a proceeding for carrying out the mixing the higher utilization of the heat aimed at cannot be obtained, because the combustion gases take up a rather considerable amount of water vapours from the water and carry off the heat contained therein.

Another way of mixing consists in placing the spray nozzle and the gas burners side by side on the lower end of a slightly inclined mixing tube, so that the water to be heated is first of all projected slantwise upwardly in the same direction as the combustion gases are flowing, and after being reverted runs back in a counter-current to the combustion gases. The drawback mentioned above exists also in this manner of mixing, although to a lower degree, as the water on the spot, where the combustion gases are separating from it, has already reached a considerable temperature. But much more disadvantageous than this loss of heat is in this second form of mixing, the fact that the length of the spray-cone produced by the nozzle and consequently also the length of the way, on which the exchange of heat takes place, is dependent on the pressure of the water. If this pressure is diminishing to a lower degree than the one on which the construction of the apparatus had been based, as will happen for instance, when a neighbouring water outlet of the same duct is opened, the spray cone, which means the way of the heat exchange, becomes shorter and the combustion gases escape at a high temperature.

All these disadvantages are avoided by the present invention, the essential feature of which consists in the following proceeding:

The water to be heated is first of all injected in the direction of the escaping combustion gases into the upper part of the mixing chamber and thereafter lead back, in countercurrent to the combustion gases, through the entire mixing chamber. Thus the way, which in the lower part of the mixing chamber the still hot gases travel in countercurrent to the water partly already heated, is rendered independent of the water pressure, whilst in the upper part of the mixing chamber the cold water comes into contact with the gases, when they are already considerably cooled down, so that the vapours contained therein are condensed by it.

The drawing shows an illustrative apparatus adapted for practicing the method and embodying apparatus features of the invention. In said drawing, Fig. 1 is a diagrammatic sectional view of the apparatus, and Fig. 2 is a partial view showing an adjustable spray nozzle.

The lower part $a$ of the mixing chamber is formed by two cylinders $b$, $c$ of sheet metal, arranged concentrically and united by an annular bottom, the outer one, $b$, being closed on top by a cover $d$, from which a tube $e$ extends vertically upward. Within the inner cylinder $c$ a gas burner $f$ is placed and above this burner a screen $g$, between which and the upper side of the cylinder $c$ there is a slot $h$ or several openings for the passage of the combustion gases. The combustion chamber $i$ is large enough to secure perfect combustion under any circumstances, so that the flames cannot lash through the opening $h$ into the mixing chamber.

In the tube $e$ a spray-nozzle $k$ is mounted, to which the water is conducted under pressure by the pipe $j$, and which, by discharging upwardly, produces a suction effect in the direction, in which the combustion gases are mounting owing to their natural draft. The upwardly projected particles of water are first for a certain distance flying in the direction of flow of the combustion gases, and after being reverted, fall in counter-current to the combustion gases through the lower part of the tube e, forming the upper part of the mixing chamber, into the compartment a, being kept by means of the screen g from entering the combustion chamber. A portion of the water particles projected upwardly, on touching the walls of the tube e, will unite, thus forming larger drops, which would flow down on the walls of the tube without mixing with the combustion gases. In order to avoid this, a cone-shaped guiding surface r is provided in the neighbourhood of the spray nozzle k, which surface, by guiding the dripping water back toward the middle of the tube compels it to take its way through the stream of the combustion gases. The warm water is led off from the lower part of the mixing chamber a by a pipe m.

On the way through the compartment a as well as through the lower part of the mixing tube e and indirectly also by means of the screen g, the combustion gases transfer a great part of their heat to the water, so that at their arrival in the passage around the nozzle k their temperature has fallen to about the same amount, at which in ordinary cases they would escape without further utilization. By the direct contact with the cold water, which by means of the nozzle k, is very finely divided, their remaining utilizable heat is drawn out of them, this transmission of warmth being favourably influenced by the fact, that the upwardly flying particles of water are forming a resistance to the little drops falling down, so that a very intense contact of prolongated duration takes place in the space above the nozzle. Of a most favorable influence for the utilization of the heat is furthermore the fact, that the water vapours, taken up by the combustion gases on their way through the lower part of the mixing tube from the water, which there is already rather hot, are condensed again near the spray nozzle k by the very finely divided particles of cold water, thus transferring their heat to the latter.

The higher the nozzle k is placed in the tube e, the lower the temperature of the combustion gases will be when escaping to the chimney. In order to enable regulating this final temperature and thereby also the draft of the chimney, the nozzle k may be mounted adjustably in the tube e, so that its position as regards height can be varied. As shown in Fig. 2, the nozzle is carried by a short pipe sleeved on the upwardly-turned end portion of the pipe j and adjustable thereon for varying the position of the nozzle longitudinally of the tube e and held in adjusted position and the connection made tight by a stuffing box nut j'.

As is seen from what is said, by placing the nozzle in the upper part of the mixing chamber the advantages of the counter current principle are fully secured and at the same time also a suction effect is produced on the combustion gases by the water to be warmed. The influence of a change of the water pressure is practically eliminated, as the exchange of heat in the whole part of the mixing tube e under the nozzle k and in the chamber a is independent of the suction effect produced by the nozzle k. There is also no danger of the combustion being rendered imperfect by changes of the pressure in the water duct or gas-pipe.

Coal gas often contains constituents or impurities, which, even when perfectly burnt by means of blue burners, may cause a soiling of the water. For this reason it is to be recommended to fill in the lower part of the mixing chamber a some loosely lodged filtering material n, through which the warm water will have to pass before being led off. In order to facilitate the cleaning of this filtering material, a pipe p, provided with a stop-cock o, is inserted between the water pipe j and the part of the water compartment underneath the filtering material. Opposite to it another pipe q is led from the part of the chamber a above the filtering material to the discharge pipe m. The cross-section of the opening, through which this pipe q discharges into the pipe m, and which opening is disposed lower than the filtering mass, is smaller than the cross-section of the cock o and of the pipe p, so that part of the water entering through the latter will have to pass through the filter from below to its top, and carrying with it the impurities, will flow off through the pipe q.

What I claim is:

1. The method of heating water which comprises causing hot combustion gases to flow upward through a mixing chamber having an elongated vertical portion of relatively small cross-section and discharging the water to be heated into said vertical portion of the mixing chamber in an upwardly directed spray, permitting the water to fall in counter-current to the combustion gases through said vertical portion of the mixing chamber, and collecting and drawing off the heating water, whereby heat of the combustion gases is transferred directly to the water and water vapor is condensed out of partially cooled gases by the water spray and the suction of the spray aids in the movement of the gases.

2. The method of heating water, which comprises causing hot combustion gases to flow upward through a mixing chamber having an elongated vertical portion of relatively small cross-section, spraying cold water upwardly in said vertical portion of the mixing chamber at a distance from the lower end thereof, permitting the water to fall in counter-current to the combustion gases through said vertical portion of the mixing chamber, and collecting and drawing off the heated water.

3. Apparatus for heating water, comprising means providing a combustion chamber, a lower mixing chamber extending about the sides of the combustion chamber and inward over the top thereof, said chambers being in communication through the side wall of the combustion chamber for the passage of combustion gases and the mixing chamber being extended downward to provide a hot water chamber, and a vertical passage of relatively great length and small cross-section extending upward from the lower mixing chamber and serving as a flue for the escape of the combustion gases and as an upper mixing chamber, an upwardly directed spray nozzle mounted within said passage, and a water connection for supplying water to said nozzle.

4. Apparatus for heating water, comprising means providing a combustion chamber, a lower mixing chamber extending about the sides of the chamber and inward over the top thereof, said chambers being in communication through the side wall of the combustion chamber for the passage of combustion gases and the mixing chamber being extended downward to provide a hot water chamber, and a vertical passage of relatively great length and small cross-section extending upward from the lower mixing chamber and serving as a flue for the escape of the combustion gases and as an upper mixing chamber, an upwardly directed spray nozzle mounted within said passage at a distance from the lower end thereof, and a water connection for supplying water to said nozzle.

5. Apparatus for heating water, comprising means providing a combustion chamber, a lower mixing chamber extending about the sides of the combustion chamber and inward over the top thereof, said chambers being in communication through the side wall of the combustion chamber for the passage of combustion gases and the mixing chamber being extended downward to provide a hot water chamber, and a vertical passage of relatively great length and small cross-section extending upward from the lower mixing chamber and serving as a flue for the escape of the combustion gases and as an upper mixing chamber, an upwardly directed spray nozzle mounted within said passage and adjustable for varying its position longitudinally of the passage, and a water connection for supplying water to said nozzle.

6. Apparatus for heating water, comprising means providing a combustion chamber, a lower mixing chamber extending about the sides of the combustion chamber and inward over the top thereof, said chambers being in communication through the side wall of the combustion chamber for the passage of combustion gases and the mixing chamber being extended downward to provide a hot water chamber, and a vertical passage of relatively great length and small cross-section extending upward from the lower mixing chamber and serving as a flue for the escape of the combustion gases and as an upper mixing chamber, an upwardly directed spray nozzle mounted within said passage at a distance from the lower end thereof, a water connection for supplying water to said nozzle, and means providing a deflecting surface within said passage for deflecting downwardly flowing water from the wall of the passage.

7. Apparatus for heating water, comprising means providing a combustion chamber, a lower mixing chamber extending about the sides of the combustion chamber and inward over the top thereof, said chambers being in communication through the side wall of the combustion chamber for the passage of combustion gases and the mixing chamber being extended downward to provide a hot water chamber, and a vertical passage of relatively great length and small cross-section extending upward from the lower mixing chamber and serving as a flue for the escape of the combustion gases and as an upper mixing chamber, an upwardly directed spray nozzle mounted within said passage, a water connection for supplying water to said nozzle, filtering material filling the space between the water chamber and the lower mixing chamber proper, and water connections for providing an upward flow of water through the filtering material to clean the same.

In testimony whereof I affix my signature.

ALBERT SCHÜCKHER.